United States Patent
Levy et al.

(10) Patent No.: US 6,906,267 B2
(45) Date of Patent: Jun. 14, 2005

(54) CABLE CONNECTION INTO TUBE

(76) Inventors: Hans F. Levy, 4351 Gulf Shore Blvd. PH 6, Naples, FL (US) 34103; Peter Betz, 7686 Santa Margherita Way, Naples, FL (US) 34109

( * ) Notice: Subject to any disclaimer, the term of this patent is extended or adjusted under 35 U.S.C. 154(b) by 250 days.

(21) Appl. No.: 10/407,730

(22) Filed: Apr. 7, 2003

(65) Prior Publication Data

US 2004/0194998 A1 Oct. 7, 2004

(51) Int. Cl.$^7$ ............................................. H01B 17/26
(52) U.S. Cl. .................... 174/153 G; 174/49; 174/101; 174/95; 174/48; 422/120
(58) Field of Search ............................... 174/153 G, 49, 174/101, 95, 48; 422/120

(56) References Cited

U.S. PATENT DOCUMENTS

| | | | | |
|---|---|---|---|---|
| 3,725,568 A | * | 4/1973 | Stanley .......................... | 174/48 |
| 4,353,411 A | * | 10/1982 | Harter et al. ................. | 165/48.1 |
| 6,616,480 B2 | * | 9/2003 | Kameyama .................. | 439/587 |

* cited by examiner

Primary Examiner—Dean A. Reichard
Assistant Examiner—Jinhee Lee

(57) ABSTRACT

Disclosed is a cable installation in an office layout having a raised floor forming a plenum having air conditioned air charged therein. The conditioned air is lead through the floor by way of flexible tubes that are guided to the various office stations located above the floor. Wherever needed, the flexible tubes are connected above the floor and below the floor to rigid tubes that are located in the replaceable tiles in the raised floor. This installation requires that various cables also must be installed. It has been found that the most convenient way to accomplish this is to lead the cables through the flexible tubes to wherever they are needed. The cables are conveniently located under the floor. The rigid tube installed in the tile of the floor has a lower rigid extension. An opening is placed laterally into the rigid tube, a special plate is placed to cover the opening including a sealing element. The special plate has an opening therein so that a cable can be passed into the interior of the rigid tube and from there to the office station above the floor. Special precautions are taken to protect the cable from any damage and to prevent excessive air leakage. The cable installation can be used with either rigid or flexible tubes wherever feasible and practical.

4 Claims, 5 Drawing Sheets

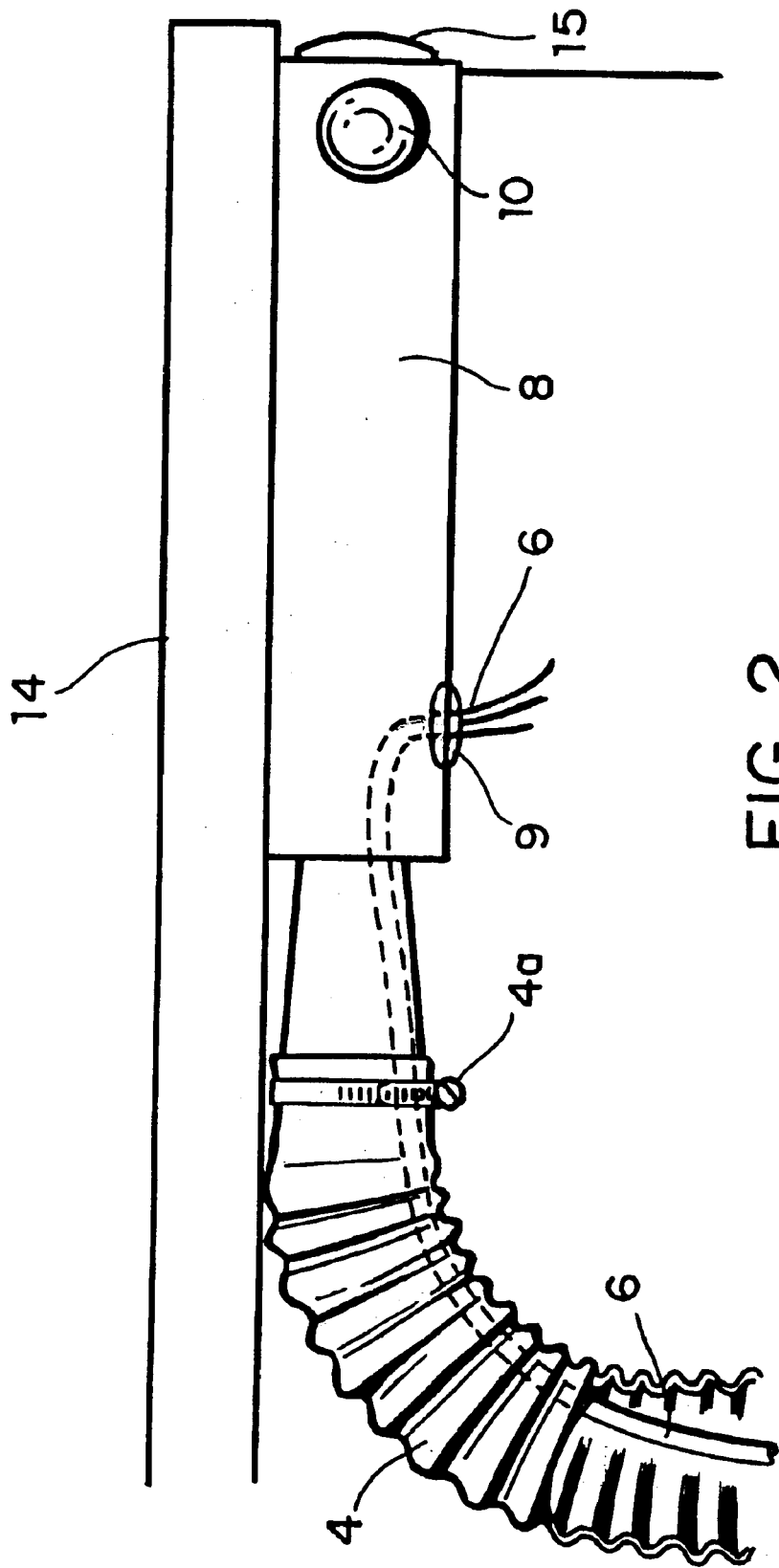

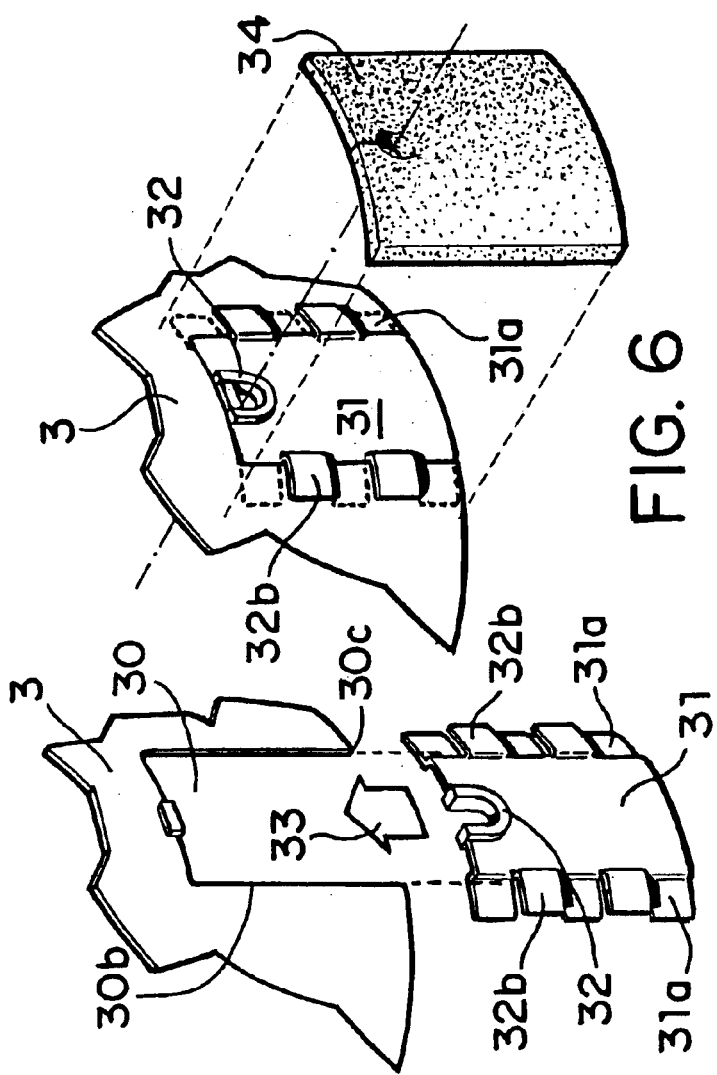

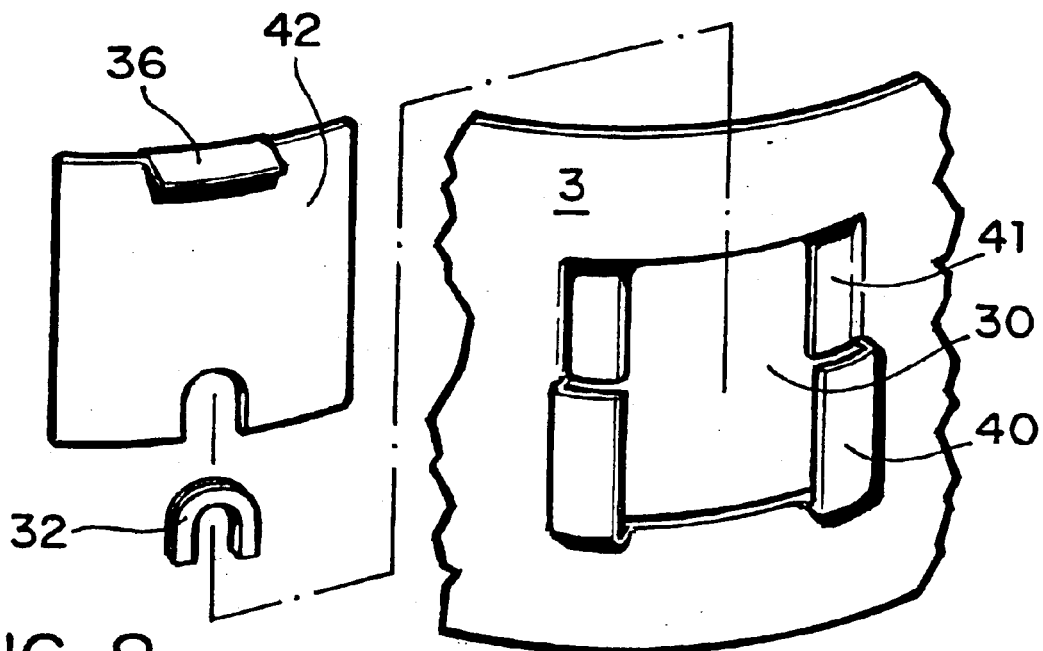
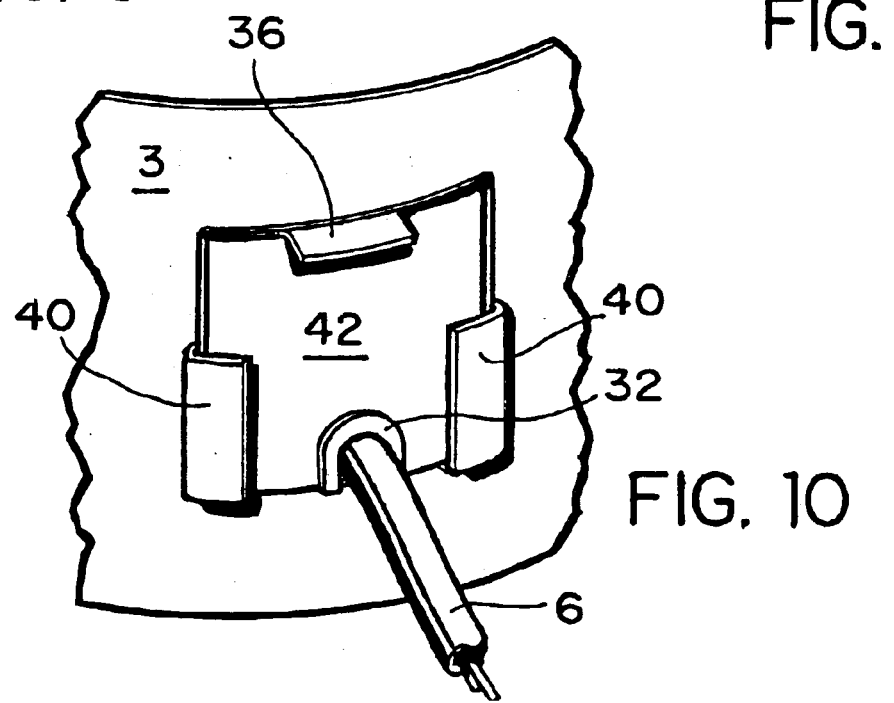

CABLE CONNECTION INTO TUBE

BACKGROUND OF THE INVENTION

The invention involves a connector plate that is used to lead cable into the interior of a flexible hose. The flexible hose delivers conditioned air from an under floor plenum through a raised floor to an air distribution system that is placed on top of the raised floor. The idea of a raised floor is to simplify the installation of an office layout on an open floor in a large office building and to enhance the office architecture. In such an arrangement everything is kept under the raised floor which in itself is a plenum containing air conditioned air. The air conditioned air is delivered to an above located desk, for example, by a flexible tube that is connected to an air distribution system located within the desk and is being controlled by an occupant sitting at the desk. An example of such an arrangement is found in applicant's prior U.S. Pat. No. 0,000,000. The problem with such an arrangement is that cables need to appear on top of such a raised floor, such as electric wires for appliances being operated on top of a desk, telephone and computer wires.

SUMMARY AND OBJECTS OF THE INVENTION

It is particularly difficult to bring wires that are located in an under floor air conditioned plenum to a location above the floor in a sound and code conforming manner so that the electrical wires, for example, do not create a hazard, such as short circuits and so on. Therefore, the inventive concept eliminates such problems by using a removable plate in the flexible duct system to alleviate any problems enumerated above.

BRIEF DESCRIPTION OF THE DRAWINGS

FIG. 1 illustrates a raised floor having a tube connection there through;

FIG. 2 shows a connection to an under desk personal air system including a cable leading through a flexible tube;

FIG. 5 shows the connector plate itself as it is mounted into a receptacle;

FIG. 6 shows the inclusion of a sealing element;

FIG. 7 illustrates a completed assembly;

FIG. 8 shows a single connector plate;

FIG. 9 shows the single connector plate of FIG. 8 installed in a connector;

FIG. 10 illustrates the single connector plate of FIG. 8 installed with a cable.

DETAILED DESCRIPTION OF THE INVENTION

Figure 1:
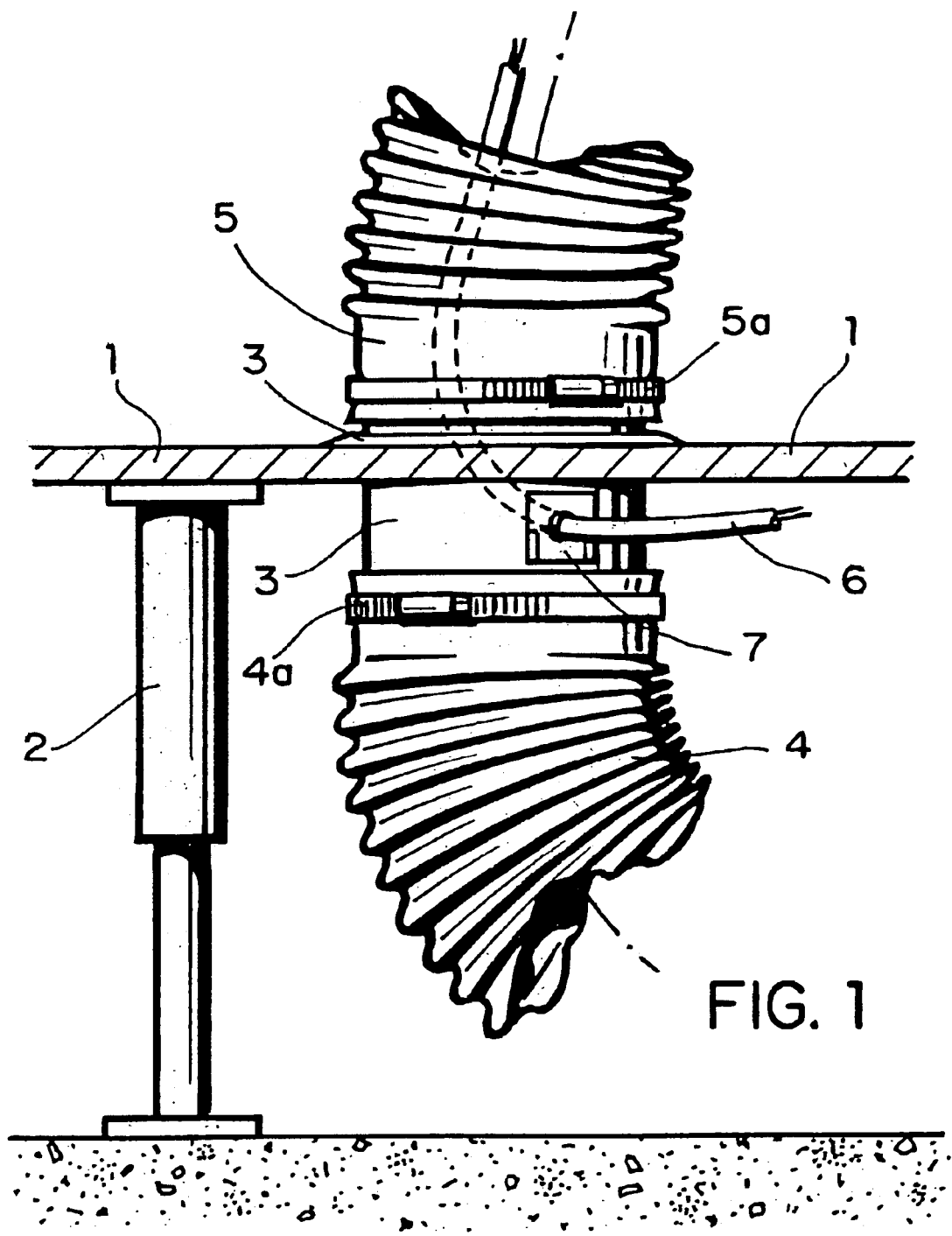

Turning now to FIG. 1 which shows the overall inventive concept. This FIG. 1 shows a supported floor 1 which forms an air plenum below the floor which is charged with conditioned air which can be tapped into at any desired location above the floor depending on the layout of the floor architecture. The floor is supported by a multiple of stanchions 2. At any desired location there is rigid tube 3 which passes through the floor so that any location can be chosen. The prior patent mentioned above shows how various tiles can be interchanged with the rigid tubes already installed. At the lower end of the rigid tube 3 there is a flexible or rigid tube 4 installed which may derive conditioned air from a fan plenum located below the raised floor. The flexible tube 4 is fastened to the lower end of the rigid tube by way of a tension adjustable band 4a. A cable 6 is passed into the interior of the rigid tube by way of a plate 7 which will be explained in more detail below. By passing through the rigid tube 3, the cable 6 ends up in the interior of the upper flexible tube 5 which is fastened to the upper end of the rigid tube 5 by way of the tension adjustable band 5a. Now it can be seen that the cable 6 is passed from a loose condition under the elevated floor 1 into the interior of the upper end of the rigid tube 3 to wherever the flexible tube 5 is destined to lead.

In FIG. 2 there is shown the outline of a personal air conditioning plenum 8 which is installed under the desk top 14 and which has a lower flexible or rigid tube attached thereto by way of the tension adjustable band 4a. In this installation, the loose cable 6 within the tube 4 enters the air plenum 8 to be installed in plugs on top of the desk (not shown) and for the cable 6 to continue under the desk to wherever it is needed, such as telephone and computer devices and cables. 9 represents a grommet for the protection of the cable. The front of the air plenum has adjustable air outlets 15 which can be controlled by the knob 10.

Figure 3:
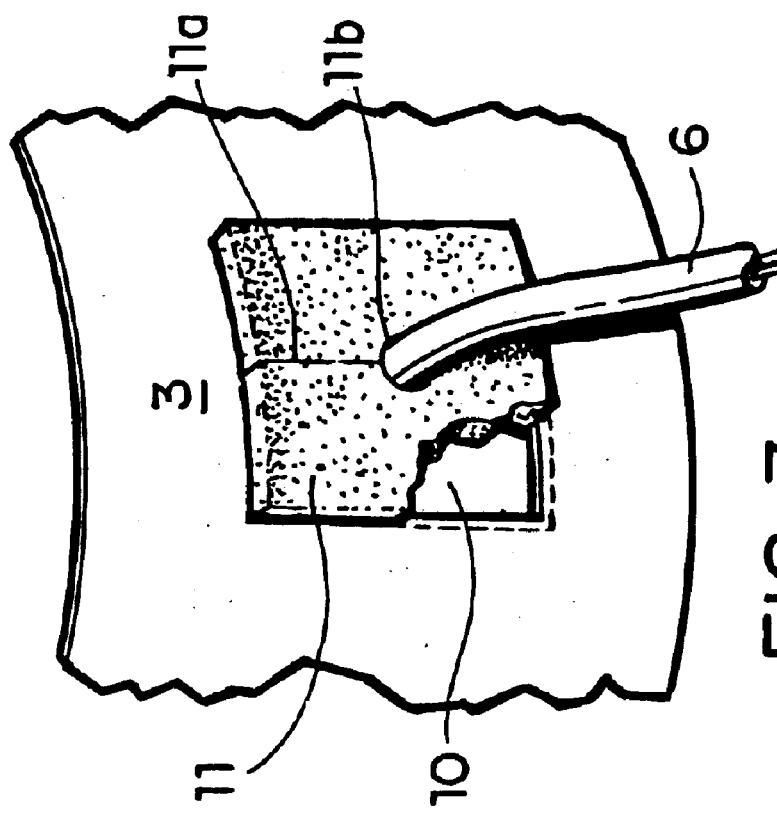
FIG. 3 shows a sealing element into a flexible tube connection.

FIG. 3 illustrates a plate 11 that fills the opening 10 in the rigid tube 3. The plate 11 can be made of a flexible material such as a foam that will easily fit the void of the opening 10 to thereby seal the same. The plate 11 has a slit 11a therein that ends in a central hole 11b to receive the cable 6 therein.

Figure 4:
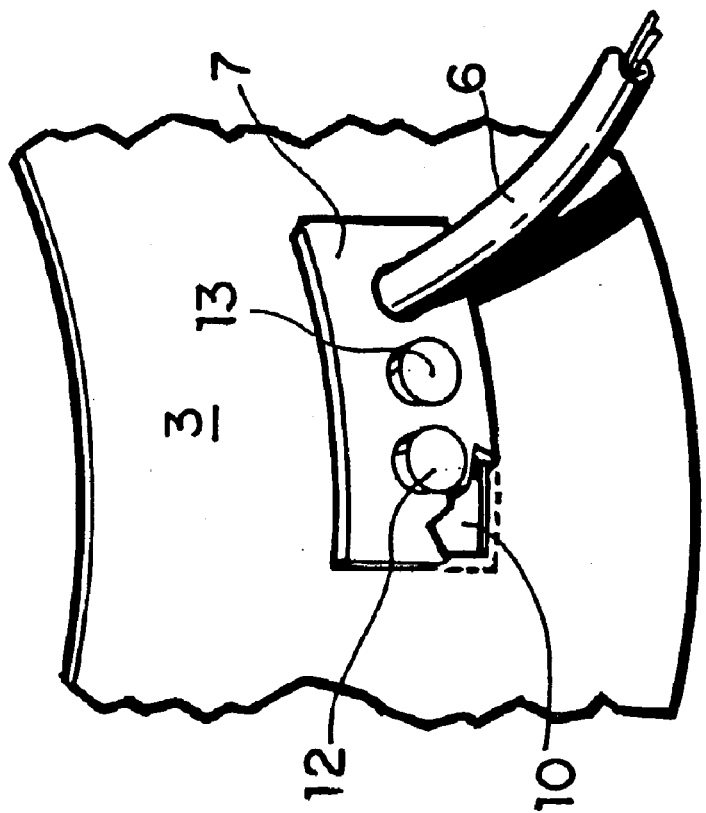
FIG. 4 illustrates a multiple way of connecting cables into a receptacle.

FIG. 4 shows the plate 7 (FIG. 1) or 11 (FIG. 3) having multiple apertures 12 and 13 therein to accommodate different types of cables therein such, as for example, telephone or computer cables. When not in use, the apertures 12 and 13 are plugged to create an air tight seal.

FIG. 5 illustrates a plate 31 that is installed in the rigid tube 3 having an opening 30 therein. The bottom opening 30c allows the plate 31 to be slid into the opening 30 of the rigid tube 3. This is accomplished by modifying the plate by having alternating tines 31a and 32b. These tines alternate in their orientation so that the tines 31a will move behind the edge 30b and the tines 32b will move in front of the edge 30b when the plate 31 is pushed into the opening 30 of the rigid tube 3.

FIG. 6 shows the plate 31 installed in the rigid tube 3. Included in this installation is a grommet 32 for the cable 6 to ensure the integrity of the cable 6 according to the electrical code. In an exploded view is shown an insulating foam plate 34. When the installation is completed, as is shown in FIG. 7, the insulation foam plate 34 will cover the inserted plate 31 of FIGS. 5 and 6 completely to ensure integrity within the air conditioned system.

FIGS. 8–10 show a somewhat different insertion plate 42 which may be inserted in a rigid tube 3 which has an opening 30 intermediate its ends. The plate 42 is clean (no tines) at all its sides except for an upper handle piece 36. In this instance, the edges of the opening 30 are modified to have forward 40 and rearward retention tines 41. FIGS. 9 and 10. By grasping the handle 36, the plate 30 is merely inserted into the opening in the rigid tube 3 and will be kept in place by the inner retention tines 41 and the outer retention tines 40. Included in this installation is the grommet 32, again to maintain the integrity of the electrical cable.

What is claimed is:

1. A cable installation in an under floor plenum air conditioning system comprising a rigid tube installed in a tile of said floor, an upper end of said rigid tube having an upper flexible tube installed over an upper end of said rigid tube, a lower end of said rigid tube below said floor having a lateral opening therein, said lateral opening being covered by a plate, said plate having an opening therein to allow for the passage of a cable there through, said opening in said plate being sealed against air pressure, and a lower flexible tube is installed over another end of said rigid tube, said lower flexible tube is partially installed over said plate to seal said lateral opening in said lower end of said rigid tube.

2. The cable installation of claim 1, said plate covering said lateral opening includes a sealing plate to close and seal said lateral opening.

3. The cable installation of claim 1 including a grommet to accommodate said cable.

4. The cable installation of claim 1, wherein said plate has at its edges alternating tines which alternate in a forward and rearward direction, said tines will hold said plate in place when slid into said lateral opening.

* * * * *